Feb. 10, 1959 L. G. EHMANN ET AL 2,872,716
CHOKER HOOK
Filed Aug. 21, 1956
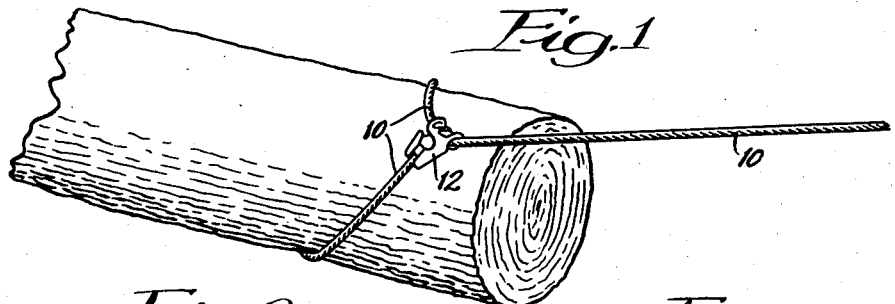
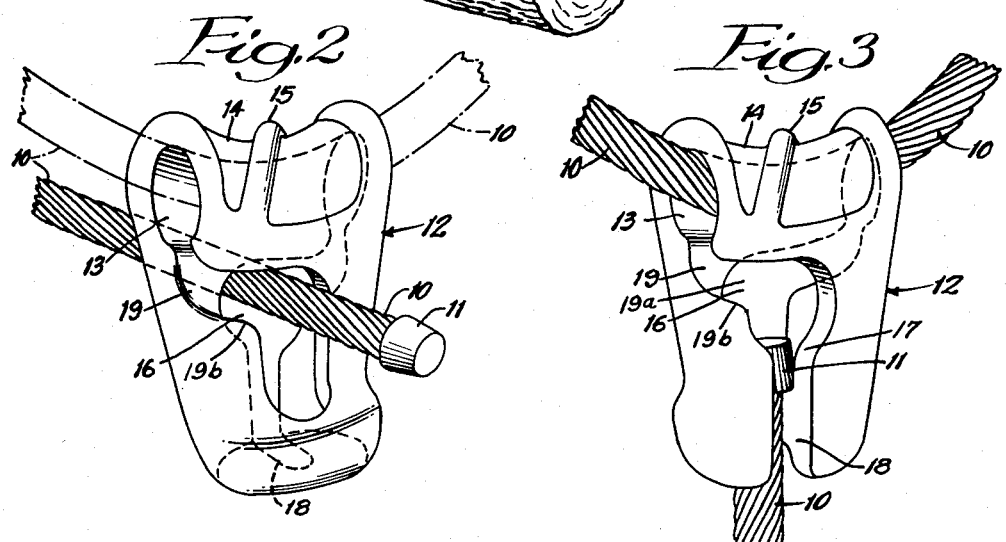
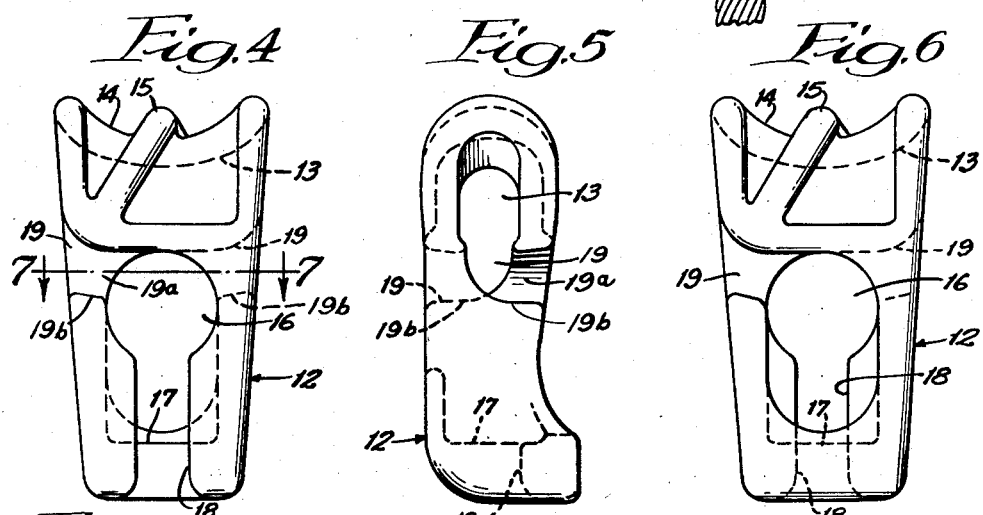
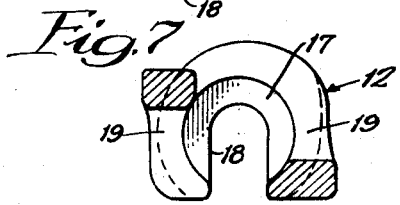
INVENTORS,
Leslie G. Ehmann,
Herbert Nelson
BY Dawson, Tilton & Graham,
ATTORNEYS

United States Patent Office 2,872,716
Patented Feb. 10, 1959

2,872,716

CHOKER HOOK

Leslie G. Ehmann, Portland, Oreg., and Herbert Nelson, Spokane, Wash., assignors to Electric Steel Foundry Company, Portland, Oreg., a corporation of Oregon Application August 21, 1956, Serial No. 605,294

6 Claims. (Cl. 24—123)

This application relates to a choker hook, and more particularly to a hook employed with a cable having its ends provided with enlarged ferrules and being useful for the dragging of logs and like objects.

In the choker hooks heretofore employed, it has been necessary to extend one end of the cable free of the ferrule through the top passage of the choker hook and then to secure the ferrule to the end of the cable after the threading operation. Since the use of ferrules requires special and costly equipment for their fastening to the cables, it is the practice to secure the cable and hook in the manner above described and to ship them in assembled relation to the point of use. Unless the choker cable or rope is thus fixed to the hook, the hook would slide off the choker rope while the choker is being drawn after the truck or other transporting means, and the choker would be lost. It has been established that most choker hooks are lost in the woods rather than being worn out, and this represents a very substantial loss. If new chokers with end fittings attached were available when the old choker cables wore out and if it were possible to make a new choker assembly with the choker hook on the spot, the extent of the loss could be greatly reduced.

Under the present practice, as stated above, it is customary to secure the cable upon the hook by means of the ferrules pressed upon the ends of the cable and thereafter, when the cable is worn and has to be discarded, it is necessary to return the assembly to some place where the ferrule can be removed, the cable withdrawn, and a new choker cable inserted, and the inserted end then equipped with a ferrule.

About a decade ago, I, Leslie G. Ehmann, developed a guy line hook with which it was possible to assemble a ferrule-equipped cable and permitting use of the hook in the making of hitches for the connection of guy line cables to a spar tree. Such hitches were made high on the spar tree by the "high climber" who held on to the tree while making the hitch, and the operation was greatly facilitated by the inserting of the ferrule-equipped end of the cable through the hook so that the hook automatically falls into position when released and without requiring twisting of the cable. The structure is shown in my U. S. Patent No. 2,503,151, issued April 4, 1950.

We have recently discovered that it is possible through making a critical change in the structure shown in said above patent to enable this structure to be employed effectively as a choker hook, thus making it possible to introduce the ferrule-equipped cable at the place of use while at the same time so securing the cable within the hook that the hook will not slide off the cable when the assembly is drawn or when the end fittings of the choker dangle loose.

An object of the present invention is to provide a choker hook permitting assembly therewith of ferrule-equipped cables or chokers while at the same time securing the choker within the hook so that it will not be lost when the assembly is dragged behind the tractor. Another object is to provide a choker hook which may be employed with a choker cable or rope having enlarged ferrules secured to the ends thereof, attachment and detachment of the cable from the hook being manually accomplished at the place of use so that the cable is brought into the slip sleeve passage of the hook, while at the same time, after being manually released, the hook and choker assembly remain in secure connected relation. Other specific objects and advantages will appear as the specification proceeds.

The invention is shown, in an illustrative embodiment, by the accompanying drawing, in which Figure 1 is a perspective view of a choker equipped with a hook embodying my invention and providing a noose for engagement with a log; Fig. 2, a broken perspective view showing the ferrule-equipped end of the cable being inserted through the through opening of the hook; Fig. 3, a view similar to Fig. 2 but showing the choker parts in final engagement with the hook; Fig. 4, a front view in elevation; Fig. 5, a side view in elevation; Fig. 6, a rear view in elevation; and Fig. 7, a transverse sectional view, the section being taken as indicated at line 7—7 of Fig. 4.

In the illustration given, 10 designates a cable or rope which is equipped at each end with a ferrule 11. 12 designates the body of a choker hook which is provided near its top with a slip sleeve transverse passage 13 adapted to receive the curved portion of the cable 10, as illustrated best in Fig. 3. I prefer to form the upper portion of the hook in the curved form illustrated at 14 so as to fit the cable 10 when the same is in a noose-forming position, as illustrated in Fig. 1. Further, I prefer to reinforce the saddle or curved upper portion of the hook with an angularly-extending rib 15, as illustrated.

The central portion of the choker hook body 12 is provided with a through opening 16 which is large enough to receive the ferrule 11 after the same has been secured upon the cable so as to form an enlarged end for the cable. The passing of the ferrule through the through opening 16 is illustrated best in Fig. 2.

The lower portion of the hook 12 is provided with a tapered socket 17 adapted to receive the ferrule 11 on the lower end of the cable, as illustrated best in Fig. 3, and the socket is provided with a side opening slot 18 to pass the cable 10 therethrough, as illustrated in Fig. 3. With this structure, the lower ferrule and the cable portion 10 secured thereto are found to remain firmly in position during the period in which the cable and hook assembly are being dragged behind the tractor.

Extending between the through opening 16 and the slip sleeve 13 is an entrance slot 19, as shown best in Figs. 2 and 3, this slot being in the shape of an elongated open slot which is gradually twisted from one end to the other about the longitudinal axis of the body so that the two ends thereof are disposed in angular relationship to each other. An entrance slot 19 leads angularly from the upper portion of the through opening 16 to the slip sleeve 13, whereby a cable within said through opening must be turned or rotated at least partially upon itself to move through said slot into said slip sleeve. In the illustration given, the slot 19 includes narrow passages 19a on each side extending in opposite directions and communicating with opposite ends of said through opening 16 and adjacent the passages 19a are provided generally horizontal shoulders 19b for supporting the cable when the cable has been moved into alignment with said slip sleeve. We have found that when the slot 19 is narrowed so that it provides a tight frictional engagement with the cable 10, the cable may be manually twisted or turned to bring it from the position shown in Fig. 2 to the final position within the slip sleeve as shown in Fig. 3 and then, when manually released, the slip sleeve portion of the hook retains the cable in secure position and against release even though the end of the choker with its fittings be allowed to dangle from a tractor or is dragged on the ground behind a tractor.

In the operation of the structure, it is possible to ship the hook and cable choker, equipped with ferrules at the end thereof, to the place of use and there to connect the parts by passing the ferrule-equipped end through the through opening, as illustrated in Fig. 2, and then by manually twisting or rotating the cable, to thread it into the position shown in Fig. 2, the ferrule-equipped end being then secured within the socket at the other end of the hook, as illustrated in Fig. 3. Should the choker become injured or wear so that it is necessary to provide a new choker assembly, it is merely necessary to disengage the ferrule-equipped end of the choker from the socket 17 and then to thread the upper portion of the cable within the slip sleeve downwardly through the frictionally tight entrance slot 19 and to draw the cable and ferrule then through the through opening. In a reverse manner, the new cable choker with the ferrules thereon may be inserted in position, following the steps above described. For example, when the cable-equipped ferrule is passed through the opening, as shown in Fig. 2, the straight length of cable may simply be rotated about the portion of the cable within the through opening 16 so that the straight cable portions move into the slots 19a above the shoulders 19b, the straight portion of the cable being raised during this operation into the slip sleeve 13 above slot 19, as can be seen best in Fig. 5.

During use, when the choker and hook assembly are being conveyed from one area to another, the hook remains securely in position upon the choker, the upper or noose-forming portion of the cable being retained within the slip sleeve passage, as in the normal choker hook, while the lower ferrule-equipped end of the cable is held within the socket. By reducing the width of the entrance slot 19 so that it approximates very closely the actual diameter of the rope or cable, it is found that detachment of the rope will not occur except when the rope is deliberately turned or twisted within the entrance slot 19 to bring it from the slip sleeve and into alignment with the through opening.

While, in the foregoing specification, we have set forth a specific structure in considerable detail for the purpose of illustrating the invention and the new results achieved thereby, it will be understood that such details of structure may be varied in many ways, particularly as to form, without departing from the spirit of our invention.

We claim:

1. A choker hook for assembly with a cable having a ferrule-equipped end, comprising a metallic body having at its upper end a slip sleeve adapted to hold the cable therein when providing a noose for engaging an object to be drawn, said body having centrally disposed therein a through opening extending below said slip sleeve and a portion thereof separating said slip sleeve from said opening, said body having at the lower end thereof a socket for retaining the ferrule, said body having also an entrance slot establishing communication between said through opening and said slip sleeve, said slot being narrow and leading angularly from the upper portion of said through opening, whereby a cable within said opening must be rotated upon itself to move through said slot into said slip sleeve, and said body providing shoulders adjacent said slot for supporting said cable in said slip sleeve when the cable is rotated into alignment with said slip sleeve.

2. The structure of claim 1, in which said shoulders are substantially horizontal.

3. The structure of claim 1, in which said entrance slot provides narrow horizontal passages on each side thereof extending in opposite directions and communicating with opposite ends of said through opening.

4. A choker hook for assembly with a cable having a ferrule-equipped end, comprising a metallic body providing at its upper end a slip sleeve adapted to hold the cable therein when providing a noose for engaging an object, said body having a through opening in a plane transverse to the plane of said slip sleeve and spaced from said slip sleeve, said body also having at the lower end thereof a socket for retaining the ferrule, said socket communicating with said through opening through a slot having a side opening adapted to pass said cable, said body having also an entrance slot establishing communication between said through opening and said slip sleeve, said slot being narrow and leading angularly from the upper portion of said through opening, whereby a cable threaded through said through opening must be rotated at least partially upon itself for movement from said slot into said slip sleeve, and said body providing generally horizontal shoulders adjacent said slot for supporting said cable in alignment with said slip sleeve.

5. The structure of claim 4, in which the end portion of the body about said slip sleeve is arcuate in shape to fit the contour of the cable and includes a spiral rib which extends about said arcuate portion.

6. A choker hook adapted for use with a cable having an enlarged end ferrule, comprising a metal choker hook body having at its upper end a transverse slip sleeve adapted to hold the cable therein while providing a noose, said body having a central through opening extending substantially at right angles to the plane of said slip sleeve, said body also having at the lower end thereof a socket for receiving and retaining the ferrule and communicating with said through opening by means of a slot having a side opening adapted to pass said cable, said body being provided with oppositely-disposed narrow passages communicating with opposite ends of said through opening and with a transverse entrance slot forming a continuation of said slip sleeve, and said passages being substantially horizontal and generally at right angles to said slip sleeve, whereby a straight portion of cable extending through said through opening may be raised to the upper portion of said through opening and then rotated to bring the cable into alignment with said slip sleeve.

References Cited in the file of this patent

UNITED STATES PATENTS 2,503,151    Ehmann  ---------------- Apr. 4, 1950

FOREIGN PATENTS 517,059    Canada  ---------------- Oct. 4, 1955